United States Patent
Yanase et al.

(10) Patent No.: US 8,851,962 B2
(45) Date of Patent: Oct. 7, 2014

(54) BARREL-SHAPED THREADED TOOL FOR MACHINING INTERNAL GEAR

(75) Inventors: Yoshikoto Yanase, Ritto (JP); Masashi Ochi, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 539 days.

(21) Appl. No.: 13/142,022

(22) PCT Filed: Nov. 13, 2009

(86) PCT No.: PCT/JP2009/069334
§ 371 (c)(1),
(2), (4) Date: Jul. 19, 2011

(87) PCT Pub. No.: WO2010/073848
PCT Pub. Date: Jul. 1, 2010

(65) Prior Publication Data
US 2011/0269383 A1    Nov. 3, 2011

(30) Foreign Application Priority Data
Dec. 25, 2008   (JP) ................................ 2008-329566

(51) Int. Cl.
*B23F 21/02* (2006.01)
*B23F 21/10* (2006.01)

(52) U.S. Cl.
CPC ................................. *B23F 21/026* (2013.01)
USPC ............................... 451/547; 409/65; 451/47

(58) Field of Classification Search
USPC .......... 407/23, 24, 26; 409/65, 66; 451/49, 51, 451/61, 114, 147, 547, 47
See application file for complete search history.

(56) References Cited

U.S. PATENT DOCUMENTS

| 2,615,359 | A | * | 10/1952 | Cook et al. ..................... 82/19 |
| 4,174,914 | A | * | 11/1979 | Ainoura ......................... 407/26 |
| 4,635,404 | A | * | 1/1987 | Wirz ............................ 451/250 |
| 8,382,560 | B2 | * | 2/2013 | Yanase et al. ................. 451/547 |
| 2010/0210198 | A1 | | 8/2010 | Yanase et al. |

FOREIGN PATENT DOCUMENTS

| CN | 201086106 Y | 7/2008 |
| FR | 2.070.927 | 9/1971 |
| JP | 51-38118 | 10/1976 |

(Continued)

OTHER PUBLICATIONS

Hoyashita, "Barrel Worm-Shaped Tool with Conjugate Cutting-Edge Profile Generated from Tooth Profile of Internal Gear", Transactions of the Japan Society of Mechanical Engineers C, Jan. 1996, vol. 62, No. 593, pp. 284-290.

*Primary Examiner* — Timothy V Eley
(74) *Attorney, Agent, or Firm* — Birch, Stewart, Kolasch & Birch, LLP (57) ABSTRACT

An object is to provide a barrel-shaped threaded tool for machining an internal gear which is capable of machining with high accuracy by appropriately setting a helix angle. To achieve the object, in a threaded grinding wheel (11) formed into a barrel shape having a diameter gradually decreasing from an axially intermediate portion thereof toward axially opposite end portions thereof so that the threaded grinding wheel (11) is meshed with a workpiece (W) with a crossed axes angle ($\Sigma$) therebetween during the machining of the workpiece (W), the helix angle is set in accordance with the length from the axially intermediate portion.

2 Claims, 6 Drawing Sheets

(56) References Cited

FOREIGN PATENT DOCUMENTS

| JP | 60-39022 A | 2/1985 |
| JP | 60-194423 U | 12/1985 |
| JP | 2-198711 A | 8/1990 |
| JP | 2009-142939 A | 7/2009 |
| TW | 320679 | 11/1997 |

* cited by examiner

| | 1 | 2 | 3 | 4 | 5 | 6 | 7 |
|---|---|---|---|---|---|---|---|
| HELIX ANGLE OF THREADED GRINDING WHEEL (AXIALLY INTERMEDIATE PORTION) (deg) | 55 | 55 | 55 | 55 | 55 | 55 | 55 |
| SHAFT ANGLE (deg) | 35 | 35 | 35 | 35 | 35 | 35 | 35 |
| GRINDING WHEEL WIDTH (mm) | 20 | 25 | 30 | 35 | 40 | 45 | 50 |
| AMOUNT OF CHANGE IN GRINDING WHEEL HELIX ANGLE (deg) | 0.64 | 0.99 | 1.42 | 1.91 | 2.47 | 3.09 | 3.76 |

| | 1 | 2 | 3 | 4 | 5 | 6 | 7 |
|---|---|---|---|---|---|---|---|
| HELIX ANGLE OF THREADED GRINDING WHEEL (AXIALLY INTERMEDIATE PORTION) (deg) | 50 | 50 | 50 | 50 | 50 | 50 | 50 |
| SHAFT ANGLE (deg) | 30 | 30 | 30 | 30 | 30 | 30 | 30 |
| GRINDING WHEEL WIDTH (mm) | 20 | 25 | 30 | 35 | 40 | 45 | 50 |
| AMOUNT OF CHANGE IN GRINDING WHEEL HELIX ANGLE (deg) | 0.38 | 0.59 | 0.84 | 1.14 | 1.47 | 1.84 | 2.25 |

| | 1 | 2 | 3 | 4 | 5 | 6 | 7 |
|---|---|---|---|---|---|---|---|
| HELIX ANGLE OF THREADED GRINDING WHEEL (AXIALLY INTERMEDIATE PORTION) (deg) | 50 | 50 | 50 | 50 | 50 | 50 | 50 |
| SHAFT ANGLE (deg) | 35 | 35 | 35 | 35 | 35 | 35 | 35 |
| GRINDING WHEEL WIDTH (mm) | 20 | 25 | 30 | 35 | 40 | 45 | 50 |
| AMOUNT OF CHANGE IN GRINDING WHEEL HELIX ANGLE (deg) | 0.29 | 0.46 | 0.65 | 0.89 | 1.15 | 1.45 | 1.77 |

| | 1 | 2 | 3 | 4 | 5 | 6 | 7 |
|---|---|---|---|---|---|---|---|
| HELIX ANGLE OF THREADED GRINDING WHEEL (AXIALLY INTERMEDIATE PORTION) (deg) | 50 | 50 | 50 | 50 | 50 | 50 | 50 |
| SHAFT ANGLE (deg) | 30 | 30 | 30 | 30 | 30 | 30 | 30 |
| GRINDING WHEEL WIDTH (mm) | 20 | 25 | 30 | 35 | 40 | 45 | 50 |
| AMOUNT OF CHANGE IN GRINDING WHEEL HELIX ANGLE (deg) | 0.40 | 0.63 | 0.90 | 1.21 | 1.57 | 1.96 | 2.39 |

Fig. 6(b)

BARREL-SHAPED THREADED TOOL FOR MACHINING INTERNAL GEAR

TECHNICAL FIELD

The present invention relates to a barrel-shaped threaded tool for machining an internal gear, the tool being formed into a barrel shape so as to be meshed with a to-be-machined internal gear with a crossed axes angle therebetween during the machining of the to-be-machined internal gear.

BACKGROUND ART

In general, a gear cutting process includes: forming a gear by machining a predetermined material of the gear by gear cutting; heat-treating the machined gear; and then finishing (grinding) the gear to remove distortion and the like due to this heat treatment. Heretofore, various tooth grinding methods using tools such as white aluminum oxide (WA) grinding wheels and superabrasive (diamond, cubic boron nitride (CBN), and the like) grinding wheels have been provided to efficiently finish the faces of the teeth of a heat-treated gear. Moreover, tools for use in these methods are in external gear form, internal gear form, screw (worm) form, and the like which are chosen in accordance with the form of a gear to be ground.

On the other hand, of gears, internal gears are frequently used in automotive transmissions and the like. Recently, there has been a demand for the improvement of machining accuracy for the purpose of reducing the vibration and noise of such transmissions.

Accordingly, heretofore, an internal gear grinding method has been provided which performs tooth face grinding by synchronously rotating a heat-treated internal gear and a barrel-shaped threaded grinding wheel in mesh with each other with a crossed axes angle therebetween. By such a method, a slip velocity between the internal gear and the threaded grinding wheel is produced using the mesh rotation and the crossed axes angle, and thereby the faces of the teeth of the internal gear can be finely ground. Such a threaded grinding wheel for use in conventional internal gear grinding is disclosed in, for example, Non-Patent Literature 1.

PRIOR ART DOCUMENT

Non-Patent Document

Non-Patent Document 1: Shigeru Hoyashita, "Barrel Worm-Shaped Tool with Conjugate Cutting-Edge Profile Generated from Tooth Profile of Internal Gear [in Japanese]," January, 1996, Transactions of the Japan Society of Mechanical Engineers C, Vol. 62, No. 593, pp. 284-290

SUMMARY OF THE INVENTION

Problems to be Solved by the Invention

In the conventional internal gear grinding method, machinability is improved by giving a crossed axes angle to a threaded grinding wheel to increase a slip velocity, as described above. Thus, the threaded grinding wheel is formed into a barrel shape which has a diameter dimension gradually decreasing from an axially intermediate portion thereof toward axially opposite end portions thereof so that the threaded grinding wheel can be appropriately meshed with an internal gear when being placed at any crossed axes angle.

Moreover, on the outer surface of the threaded grinding wheel, threads are formed to mesh with the teeth of the internal gear. This threaded grinding wheel is placed at a predetermined crossed axes angle. Accordingly, a helix angle is given to the threads. In the case where the helix angle is given to the threads of the barrel-shaped threaded grinding wheel, a contact point between a thread of the barrel-shaped threaded grinding wheel and a tooth of the internal gear is different between an axially intermediate portion of the threaded grinding wheel and axially opposite end portions thereof. Accordingly, the helix angle needs to be changed. In other words, to grind the internal gear with high accuracy, it is considered important to appropriately set the amount of change, associated with a barrel shape, in the helix angle of the threaded grinding wheel.

Accordingly, the present invention has been made to solve the above-described problems, and an object of the present invention is to provide a barrel-shaped threaded tool for machining an internal gear which is capable of machining with high accuracy by appropriately setting a helix angle.

Means for Solving the Problems

A barrel-shaped threaded tool for machining an internal gear according to a first invention to solve the above-described problems is a barrel-shaped threaded tool being formed into a barrel shape having a diameter gradually decreasing from an axially intermediate portion of the barrel-shaped threaded tool toward axially opposite end portions thereof so that the barrel-shaped threaded tool is meshed with a to-be-machined internal gear (W) with a crossed axes angle therebetween during machining of the to-be-machined internal gear, wherein a helix angle is set in accordance with length from the axially intermediate portion.

A barrel-shaped threaded tool for machining an internal gear according to a second invention to solve the above-described problems is that an increment of the helix angle gradually increases with increasing length from the axially intermediate portion.

Effect of the Invention

In the barrel-shaped threaded tool for machining an internal gear according to the present invention, the amount of change, associated with a barrel shape, in the helix angle can be appropriately set by setting the helix angle in accordance with the length from the axially intermediate portion thereof. Accordingly, machining can be performed with high accuracy.

BRIEF DESCRIPTION OF THE DRAWINGS

FIGS. 3(a) and 3(b) show a result of an analysis by simulation (1).

FIGS. 4(a) and 4(b) show a result of an analysis by simulation (2).

FIGS. 5(a) and 5(b) show a result of an analysis by simulation (3).

FIGS. 6(a) and 6(b) show a result of an analysis by simulation (4).

MODE FOR CARRYING OUT THE INVENTION

Hereinafter, a barrel-shaped threaded tool for machining an internal gear according to the present invention will be described in detail with reference to the drawings. It should be noted that in this embodiment described below, a barrel-shaped threaded tool for machining an internal gear according to the present invention is applied to a barrel-shaped threaded grinding wheel for grinding an internal gear.

Embodiment

Figure 1:
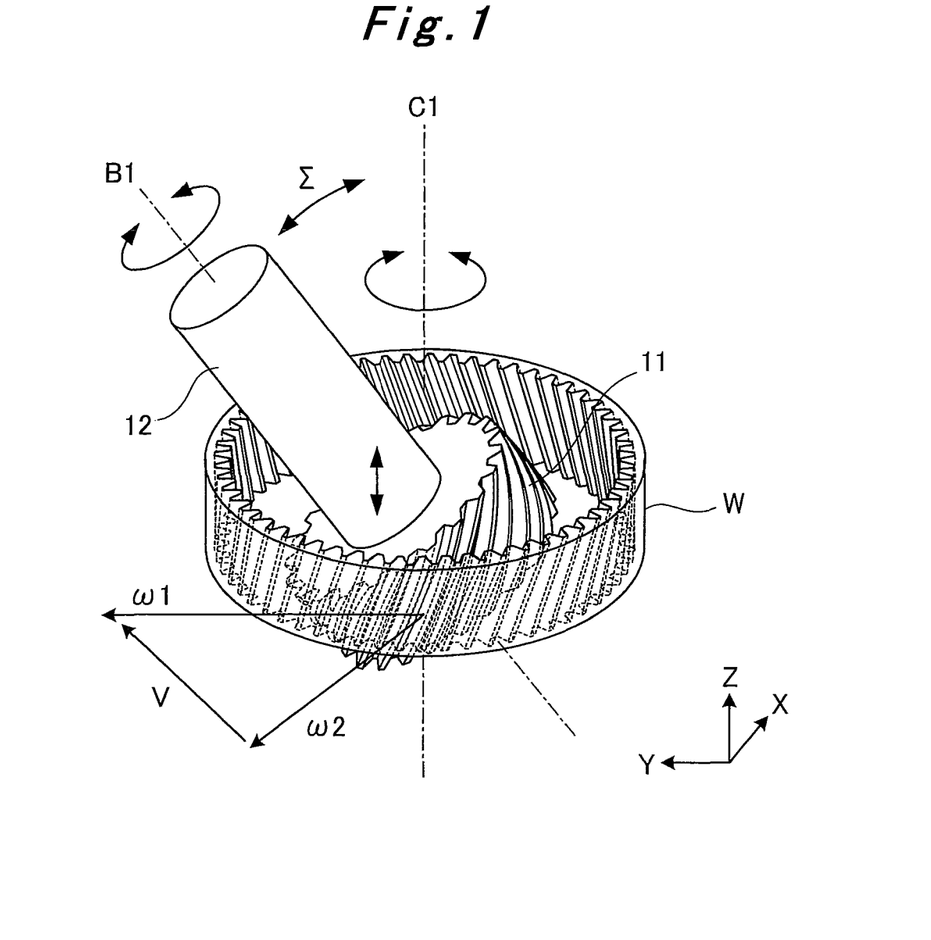
FIG. 1 is a view showing an internal gear grinding method using a barrel-shaped threaded grinding wheel according to one embodiment of the present invention.

As shown in FIG. 1, an internal gear grinding machine (not shown) is intended to grind a workpiece (to-be-machined internal gear) W using a threaded grinding wheel (threaded tool) 11.

The workpiece W is attached to the internal gear grinding machine to be rotatable about a vertical (direction of the Z axis) work rotation axis C1. This workpiece W is given workpiece (internal gear) specifications from which a predetermined tooth profile can be obtained.

Moreover, on the internal gear grinding machine, a grinding wheel arbor 12 is supported to be movable in the directions of the X, Y, and Z axes perpendicular to each other and rotatable about a grinding wheel rotation axis B1. Further, the threaded grinding wheel 11 for grinding the workpiece W is attached to the tip of this grinding wheel arbor 12. Accordingly, moving the grinding wheel arbor 12 in the directions of the X, Y, and Z axes and rotating the grinding wheel arbor 12 about the grinding wheel rotation axis B1 causes the threaded grinding wheel 11 to move and rotate with the grinding wheel arbor 12.

Further, the grinding wheel arbor 12 is supported to be turnable about an unillustrated grinding wheel pivot extending in the direction of the X axis. Accordingly, a crossed axes angle (hereinafter referred to as a shaft angle $\Sigma$) between this grinding wheel rotation axis B1 and the work rotation axis C1 can be adjusted by turning the grinding wheel arbor 12 about the grinding wheel pivot to change a turning angle of the grinding wheel rotation axis B1. In other words, the threaded grinding wheel 11 rotates about the grinding wheel rotation axis B1 intersecting the work rotation axis C1 of the workpiece W at the shaft angle $\Sigma$.

Figure 2:
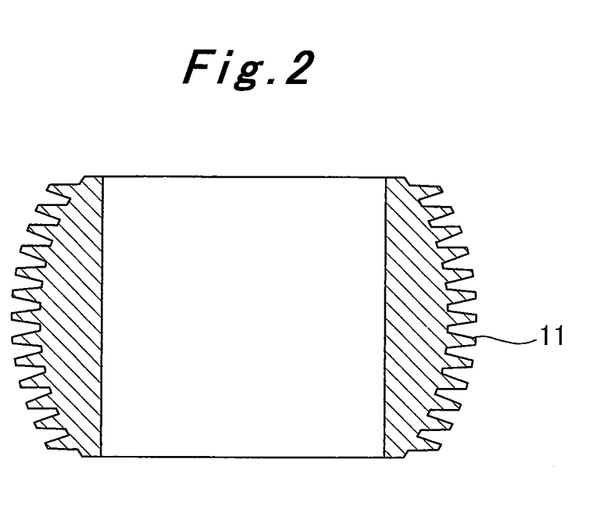
FIG. 2 is a vertical cross-sectional view of the threaded grinding wheel.

Further, as shown in FIG. 2, the threaded grinding wheel 11 is formed into a barrel shape which has a diameter dimension gradually decreasing from the axially intermediate portion thereof toward the axially opposite end portions thereof. Forming the threaded grinding wheel 11 into such a barrel shape enables this threaded grinding wheel 11 to be meshed with the workpiece W even if the threaded grinding wheel 11 is placed to be tilted at the shaft angle $\Sigma$. Further, the threaded grinding wheel 11 is given grinding wheel specifications which appropriately mesh with the workpiece specifications.

It should be noted that a grinding wheel helix angle, which is one of the grinding wheel specifications, is set to gradually change from the axially intermediate portion of the threaded grinding wheel 11 to the axially opposite end portions thereof. Details of this will be described later. Moreover, the shaft angle $\Sigma$ is found from a workpiece helix angle and the grinding wheel helix angle of the axially intermediate portion as [(the grinding wheel helix angle of the axially intermediate portion)—(the workpiece helix angle)].

Accordingly, as shown in FIG. 1, the grinding of the workpiece W with the threaded grinding wheel 11 starts with turning the grinding wheel arbor 12 to place the threaded grinding wheel 11 at the predetermined shaft angle $\Sigma$. Subsequently, the threaded grinding wheel 11 placed at the shaft angle $\Sigma$ is moved to the inside of the workpiece W, and then further moved to be meshed with the workpiece W. Further, in the above-described meshing condition, the workpiece W is rotated about the work rotation axis C1, and the threaded grinding wheel 11 is moved up and down (in a direction of the Z axis) while being rotated about the grinding wheel rotation axis B1. Thus, the faces of the teeth of the workpiece W are ground by the faces of the threads of the threaded grinding wheel 11.

Moreover, in the above-described grinding, since the threaded grinding wheel 11 rotates about the grinding wheel rotation axis B1 intersecting the work rotation axis C1 at the shaft angle $\Sigma$, a slip velocity V occurs between the threaded grinding wheel 11 and the workpiece W. This slip velocity V is a relative velocity of a workpiece angular velocity $\omega 1$ of the workpiece W with respect to a grinding wheel angular velocity $\omega 2$ of the threaded grinding wheel 11 at a contact point between a thread face of the threaded grinding wheel 11 and a tooth face of the workpiece W (the slip velocity V may also be a relative velocity of the grinding wheel angular velocity $\omega 2$ of the threaded grinding wheel 11 with respect to the workpiece angular velocity $\omega 1$ of the workpiece W). The faces of the teeth of the workpiece W are finely ground by a mesh rotation and the shaft angle $\Sigma$ producing the slip velocity V between the threaded grinding wheel 11 and the workpiece W as described above.

As described above, in the internal gear grinding method using the threaded grinding wheel 11, the shaft angle $\Sigma$ is set large to increase the slip velocity V. Because of such setting of the shaft angle $\Sigma$, the threaded grinding wheel 11 is formed into a barrel shape. Moreover, since the threaded grinding wheel 11 is thus formed into a barrel shape, a contact point between a thread of the barrel-shaped threaded grinding wheel 11 and a teeth of the workpiece W is different between the axially intermediate portion of the threaded grinding wheel 11 and the axially opposite end portions thereof. Accordingly, the grinding wheel helix angle needs to be changed.

The grinding wheel helix angle is set in accordance with the form (curvature) of the barrel shape of the threaded grinding wheel 11. However, the form of this barrel shape also steadily varies in the axial direction thereof, and it is difficult to define these using one simple formula or the like. Accordingly, it does not seem beneficial to find the grinding wheel helix angle directly from the form of the barrel shape. Thus, in the threaded grinding wheel 11 according to the present invention, attention is focused on the grinding wheel width (axial length), which is one factor to define the form of the barrel shape. Based on this grinding wheel width, the grinding wheel helix angle is set.

Next, a method of setting the grinding wheel helix angle of the threaded grinding wheel 11 will be described with reference to FIGS. 3(a) to 6(b).

To clarify the relationship between the grinding wheel width and the grinding wheel helix angle of the threaded grinding wheel 11, analyses were performed by simulations (1) to (4) below. It should be noted that in each of these simulations (1) to (4), an analysis was performed using the threaded grinding wheel 11 in which the grinding wheel helix angle of the axially intermediate portion was constant, with workpiece specifications and grinding wheel specifications changed.

First, simulation (1) will be described with reference to FIGS. 3(*a*) and 3(*b*).

In this simulation (1), workpiece specifications and grinding wheel specifications were set as shown in the following (W1) and (T1).
(W1)
Workpiece Specifications
Module: 2.0
Number of Teeth: 60
Pressure Angle: 20°
Helix Angle: 20°
Dedendum Diameter: 131.7 mm
Addendum Diameter: 123.7 mm
Face Width: 30 μm
(T1)
Grinding Wheel Specifications
Number of Threads: 23
Grinding Wheel External Diameter (Axially Intermediate Portion): 84.2 mm
Grinding Wheel Pitch Diameter (Axially Intermediate Portion): 80.2 mm
Grinding Wheel Width: 20 to 50 mm
Helix Angle (Axially Intermediate Portion): 55°

When the number of teeth, the grinding wheel external diameter and grinding wheel pitch diameter of the axially intermediate portion, the grinding wheel width, and the grinding wheel helix angle of the axially intermediate portion are set for the threaded grinding wheel 11 as described above, the shaft angle Σ, the grinding wheel helix angle of the axially opposite end portions, and the like are set accordingly. Thus, the amount of change in the grinding wheel helix angle can be found. This amount of change in the grinding wheel helix angle is the amount of change in the grinding wheel helix angle of the axially opposite end portions with respect to the grinding wheel helix angle of the axially intermediate portion, and is found as [(the grinding wheel helix angle of the axially intermediate portion)—(the grinding wheel helix angle of the axially opposite end portions)].

A simulation was performed on each of the threaded grinding wheels 11 having the above-described grinding wheel specifications. This simulation showed that the slip velocity V was as high as a satisfactory level. To examine several threaded grinding wheels 11 of these, part of the grinding wheel specifications thereof, together with the corresponding grinding wheel widths and the corresponding amounts of change in the grinding wheel helix angle, were collected in a table as shown in FIG. 3(*a*), and the relationship between the grinding wheel width and the amount of change in the grinding wheel helix angle was revealed as shown in FIG. 3(*b*).

Figure 3A:
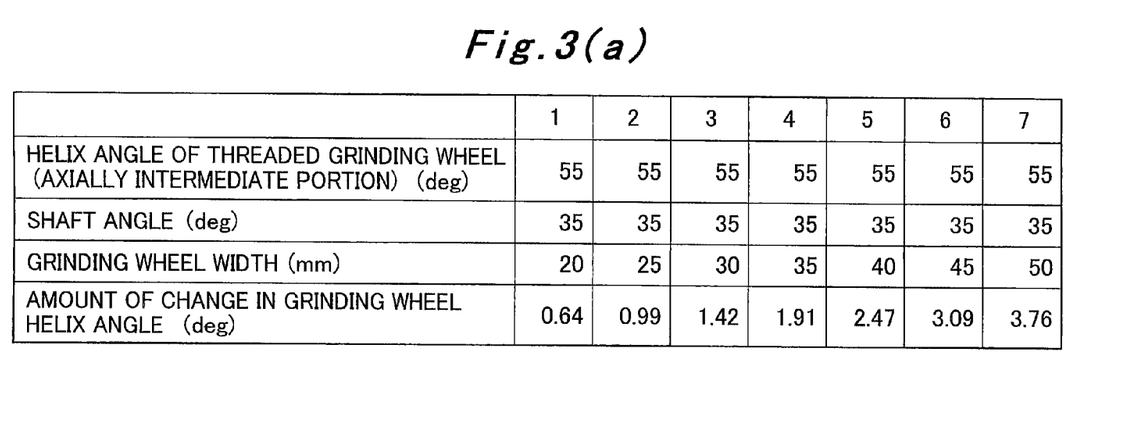
FIG. 3(a) is a table showing the amount of change in the grinding wheel helix angle in relation to grinding wheel specifications.
Figure 3B:
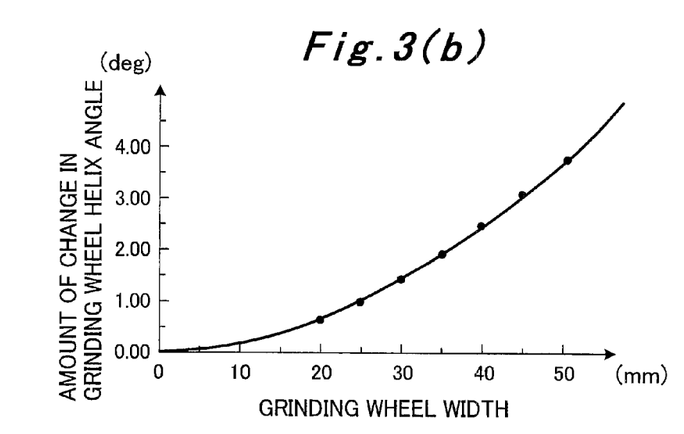
FIG. 3(b) is a view showing the relationship between the grinding wheel width and the amount of change in the grinding wheel helix angle.

Accordingly, as shown in FIG. 3(*a*), it can be seen that the amount of change in the grinding wheel helix angle increases with increasing grinding wheel width. In other words, since the diameters of the threaded grinding wheel 11 at the ends thereof decreases with increasing grinding wheel width, the grinding wheel helix angle gradually varies from the axially intermediate portion of the threaded grinding wheel 11 toward the axially opposite end portions thereof. Moreover, as shown in FIG. 3(*b*), it can be seen that the amount of change in the grinding wheel helix angle does not increase at a constant rate but the increment thereof gradually increases.

Next, simulation (2) will be described with reference to FIGS. 4(*a*) and 4(*b*).

In this simulation (2), workpiece specifications and grinding wheel specifications were set as shown in the following (W2) and (T2).
(W2)
Workpiece Specifications
Module: 2.0
Number of Teeth: 60
Pressure Angle: 20°
Helix Angle: 20°
Dedendum Diameter: 131.7 mm
Addendum Diameter: 123.7 mm
Face Width: 30 mm
(T2)
Grinding Wheel Specifications
Number of Threads: 23
Grinding Wheel External Diameter (Axially Intermediate Portion): 75.6 mm
Grinding Wheel Pitch Diameter (Axially Intermediate Portion): 71.6 mm
Grinding Wheel Width: 20 to 50 mm
Helix Angle (Axially Intermediate Portion): 50°

Figure 4A:
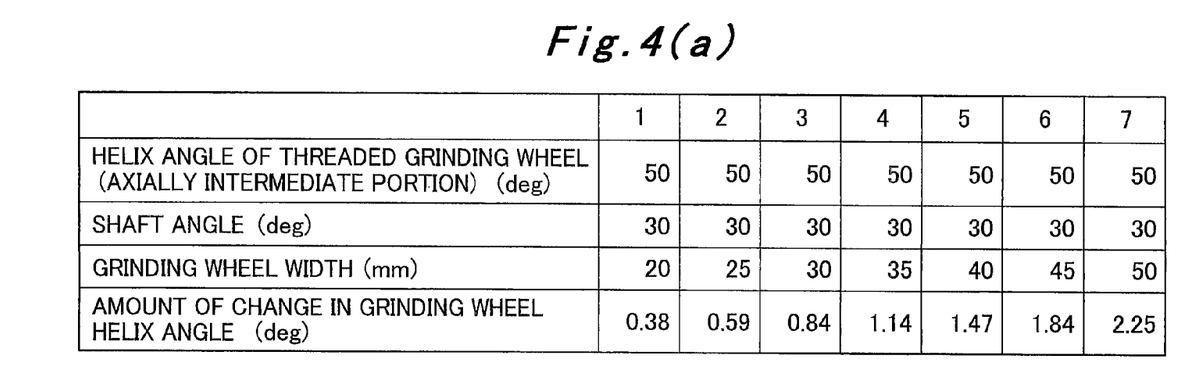
FIG. 4(a) is a table showing the amount of change in the grinding wheel helix angle in relation to grinding wheel specifications.
Figure 4B:
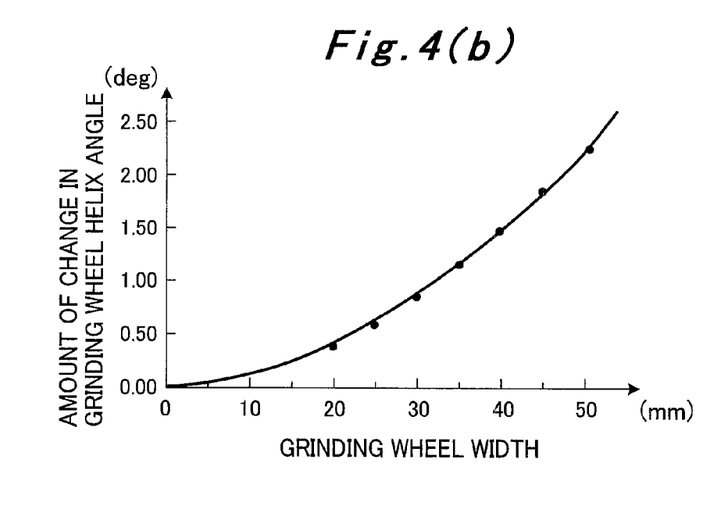
FIG. 4(b) is a view showing the relationship between the grinding wheel width and the amount of change in the grinding wheel helix angle.

Accordingly, as shown in FIG. 4(*a*), it can be seen that the amount of change in the grinding wheel helix angle increases with increasing grinding wheel width. In other words, since the diameters of the threaded grinding wheel 11 at the ends thereof decreases with increasing grinding wheel width, the grinding wheel helix angle gradually varies from the axially intermediate portion of the threaded grinding wheel 11 toward the axially opposite end portions thereof. Moreover, as shown in FIG. 4(*b*), it can be seen that the amount of change in the grinding wheel helix angle does not increase at a constant rate but the increment thereof gradually increases.

Next, simulation (3) will be described with reference to FIGS. 5(*a*) and 5(*b*).

In this simulation (3), workpiece specifications and grinding wheel specifications were set as shown in the following (W3) and (T3).
(W3)
Workpiece Specifications
Module: 2.0
Number of Teeth: 80
Pressure Angle: 20°
Helix Angle: 15°
Dedendum Diameter: 169.6 mm
Addendum Diameter: 161.6 mm
Face Width: 30 mm
(T3)
Grinding Wheel Specifications
Number of Threads: 29
Grinding Wheel External Diameter (Axially Intermediate Portion): 94.2 mm
Grinding Wheel Pitch Diameter (Axially Intermediate Portion): 90.2 mm
Grinding Wheel Width: 20 to 50 mm
Helix Angle (Axially Intermediate Portion): 50°

Figure 5A:
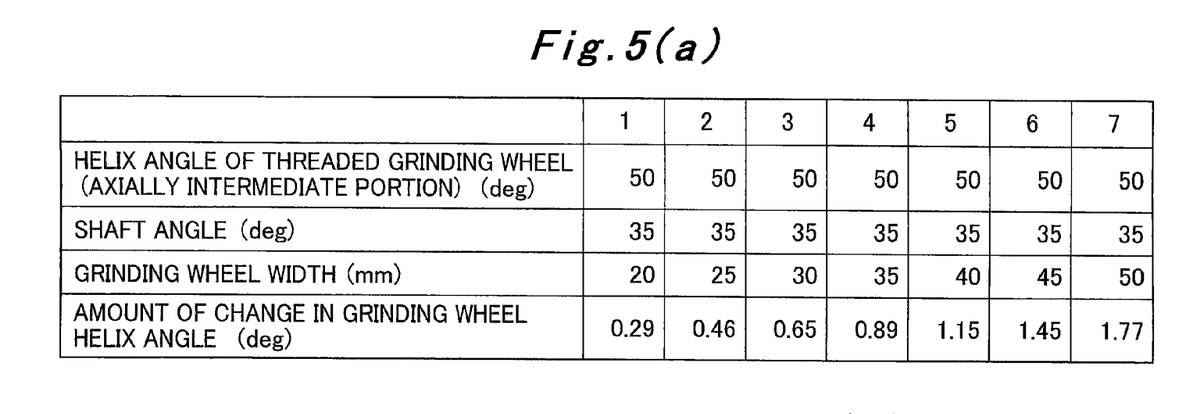
FIG. 5(a) is a table showing the amount of change in the grinding wheel helix angle in relation to grinding wheel specifications.
Figure 5B:
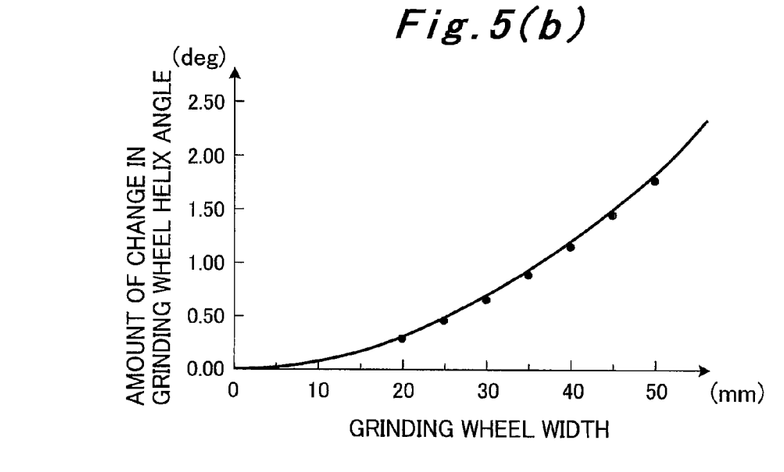
FIG. 5(b) is a view showing the relationship between the grinding wheel width and the amount of change in the grinding wheel helix angle.

Accordingly, as shown in FIG. 5(*a*), it can be seen that the amount of change in the grinding wheel helix angle increases with increasing grinding wheel width. In other words, since the diameters of the threaded grinding wheel 11 at the ends thereof decreases with increasing grinding wheel width, the grinding wheel helix angle gradually varies from the axially intermediate portion of the threaded grinding wheel 11 toward the axially opposite end portions thereof. Moreover, as shown in FIG. 5(b), it can be seen that the amount of change in the grinding wheel helix angle does not increase at a constant rate but the increment thereof gradually increases.

Next, simulation (4) will be described with reference to FIGS. 6(a) and 6(b).

In this simulation (4), workpiece specifications and grinding wheel specifications were set as shown in the following (W4) and (T4).

(W4)
Workpiece Specifications
Module: 1.2
Number of Teeth: 90
Pressure Angle: 20°
Helix Angle: 20°
Dedendum Diameter: 117.3 mm
Addendum Diameter: 112.5 mm
Face Width: 30 mm
(T4)
Grinding Wheel Specifications
Number of Threads: 31
Grinding Wheel External Diameter (Axially Intermediate Portion): 60.3 mm
Grinding Wheel Pitch Diameter (Axially Intermediate Portion): 57.9 mm
Grinding Wheel Width: 20 to 50 mm
Helix Angle (Axially Intermediate Portion): 50°

Figure 6A:
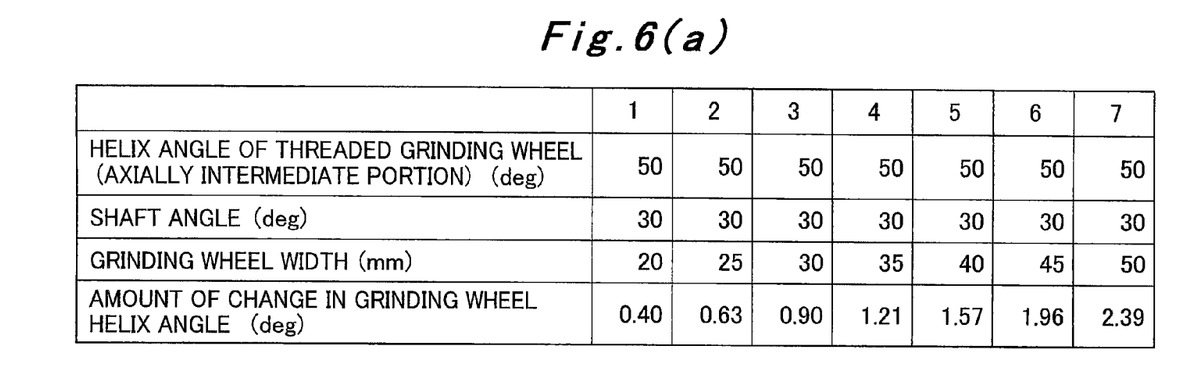
FIG. 6(a) is a table showing the amount of change in the grinding wheel helix angle in relation to grinding wheel specifications.
Figure 6B:
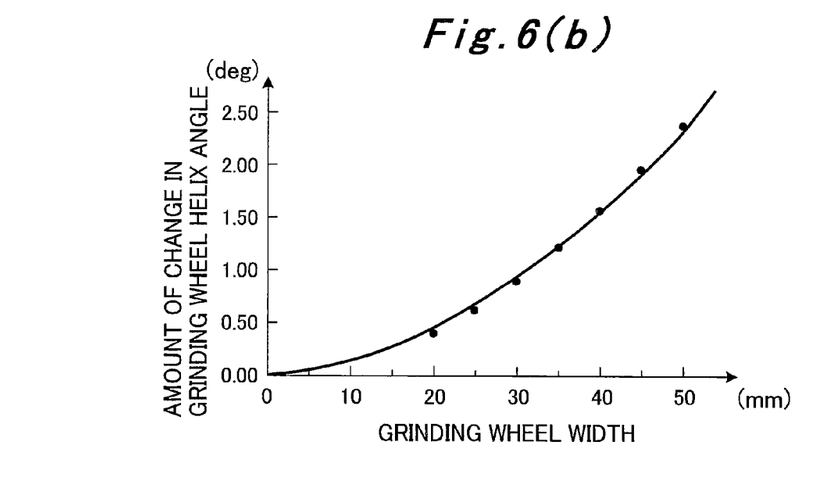
FIG. 6(b) is a view showing the relationship between the grinding wheel width and the amount of change in the grinding wheel helix angle.

Accordingly, as shown in FIG. 6(a), it can be seen that the amount of change in the grinding wheel helix angle increases with increasing grinding wheel width. In other words, since the diameters of the threaded grinding wheel 11 at the ends thereof decreases with increasing grinding wheel width, the grinding wheel helix angle gradually varies from the axially intermediate portion of the threaded grinding wheel 11 toward the axially opposite end portions thereof. Moreover, as shown in FIG. 6(b), it can be seen that the amount of change in the grinding wheel helix angle does not increase at a constant rate but the increment thereof gradually increases.

Specifically, as can be seen from FIGS. 3(a) to 6(b) in the threaded grinding wheel 11 formed into a barrel shape, the amount of change, associated with a barrel shape, in the grinding wheel helix angle can be appropriately set by setting the grinding wheel helix angle in accordance with the axial length (position) from the axially intermediate portion of the threaded grinding wheel 11. Further, the grinding wheel helix angle of one of the axially opposite end portions of the threaded grinding wheel 11 is the angle obtained by adding the amount of change in the grinding wheel helix angle according to the length from the axially intermediate portion thereof to the one end portion, to the grinding wheel helix angle of the axially intermediate portion. On the other hand, the grinding wheel helix angle of the other of the axially opposite end portions of the threaded grinding wheel 11 is the angle obtained by subtracting the amount of change in the grinding wheel helix angle according to the length from the axially intermediate portion thereof to the other end portion, from the grinding wheel helix angle of the axially intermediate portion.

Accordingly, in the threaded grinding wheel according to the present invention, the amount of change, associated with a barrel shape, in the grinding wheel helix angle can be appropriately set by setting the grinding wheel helix angle in accordance with the length from the axially intermediate portion of the threaded grinding wheel 11. Accordingly, machining can be performed with high accuracy.

It should be noted that in this embodiment, the barrel-shaped threaded tool for machining an internal gear according to the present invention has been applied to the threaded grinding wheel 11 for grinding a heat-treated workpiece W, but can also be applied to a shaving cutter for finishing an unheat-treated workpiece W.

Industrial Applicability

The present invention can be applied to a barrel-shaped threaded tool which can rapidly machine an internal gear.

The invention claimed is:

1. A barrel-shaped threaded tool for machining an internal gear, the barrel-shaped threaded tool being formed into a barrel shape having a diameter gradually decreasing from an axially intermediate portion of the barrel-shaped threaded tool toward axially opposite end portions thereof so that the barrel-shaped threaded tool is meshed with a to-be-machined internal gear with a crossed axes angle therebetween during machining of the to-be-machined internal gear, wherein
the tool having a helix angle that increases with increasing axial length from the axially intermediate portion.

2. The barrel-shaped threaded tool according to claim 1, wherein
an increment of the tool helix angle gradually increases with increasing axial length from the axially intermediate portion.

* * * * *